United States Patent
Park et al.

(10) Patent No.: US 12,475,293 B2
(45) Date of Patent: Nov. 18, 2025

(54) CELL INCLUDING INDIVIDUAL SOURCE REGIONS AND INTEGRATED CIRCUIT INCLUDING THE CELL

(71) Applicant: SAMSUNG ELECTRONICS CO., LTD., Suwon-si (KR)

(72) Inventors: Panjae Park, Seoul (KR); Yoonjin Kim, Yeosu-si (KR); Kwanyoung Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 652 days.

(21) Appl. No.: 17/891,760

(22) Filed: Aug. 19, 2022

(65) Prior Publication Data
US 2023/0136881 A1    May 4, 2023

(30) Foreign Application Priority Data
Oct. 28, 2021   (KR) .................. 10-2021-0146061

(51) Int. Cl.
  *G06F 30/392*   (2020.01)
  *G06F 30/394*   (2020.01)
  *H01L 23/528*   (2006.01)

(52) U.S. Cl.
  CPC .......... *G06F 30/392* (2020.01); *G06F 30/394* (2020.01); *H01L 23/5286* (2013.01)

(58) Field of Classification Search
  USPC ........................................................ 716/119
  See application file for complete search history.

(56) References Cited

U.S. PATENT DOCUMENTS

| | | | |
|---|---|---|---|
| 6,475,858 B2 * | 11/2002 | Sugiyama | H10B 12/485 257/E21.654 |
| 6,548,877 B2 | 4/2003 | Yang et al. | |
| 7,282,444 B2 | 10/2007 | Tanida et al. | |
| 7,889,540 B2 | 2/2011 | Asayama | |
| 10,103,172 B2 | 10/2018 | Agarwal et al. | |
| 10,121,735 B2 | 11/2018 | Nam et al. | |

(Continued)

FOREIGN PATENT DOCUMENTS

| | | | | |
|---|---|---|---|---|
| CN | 110147564 A | * | 8/2019 | ........... G06F 30/392 |
| CN | 110323203 A | * | 10/2019 | ............. G06F 30/39 |

(Continued)

OTHER PUBLICATIONS

Office Action issued Jul. 16, 2025 by the Korean Patent Office for KR Patent Application No. 10-2021-0146061.

*Primary Examiner* — Mohammed Alam
(74) *Attorney, Agent, or Firm* — Sughrue Mion, PLLC

(57) ABSTRACT

A cell including individual source regions includes active regions extending in a first direction and being spaced apart from each other in a second direction different from the first direction, gate lines extending across the active regions in the second direction and being spaced apart from each other in the first direction, first contacts arranged on both sides of each of the gate lines in the first direction and connected to the active regions, metal lines arranged over the gate lines and the first contacts, the metal lines extending in the first direction and being spaced apart from each other in the second direction, second contacts connecting the gate lines to the metal lines, and vias connecting the first contacts to the metal lines.

20 Claims, 16 Drawing Sheets

(56) References Cited

U.S. PATENT DOCUMENTS

| | | | |
|---|---|---|---|
| 10,347,627 B2 | 7/2019 | Cho et al. | |
| 10,700,076 B2 | 6/2020 | Ukai et al. | |
| 10,825,741 B2 | 11/2020 | Zang et al. | |
| 10,937,865 B2 | 3/2021 | Ishii | |
| 2002/0064898 A1* | 5/2002 | Adachi | H10B 69/00 |
| | | | 257/E21.691 |
| 2016/0093607 A1* | 3/2016 | Luan | H10D 84/401 |
| | | | 257/370 |
| 2021/0217751 A1 | 7/2021 | Liaw | |
| 2023/0136881 A1* | 5/2023 | Park | G06F 30/392 |
| | | | 716/119 |

FOREIGN PATENT DOCUMENTS

| | | | | |
|---|---|---|---|---|
| JP | 2005-167093 A | | 6/2005 | |
| KR | 10-0327347 B1 | | 3/2002 | |
| KR | 10-1043410 B1 | | 6/2011 | |
| KR | 10-2018-0032505 A | | 3/2018 | |
| KR | 10-2018-0069574 A | | 6/2018 | |
| KR | 10-2018-0136616 A | | 12/2018 | |
| KR | 20230061136 A | * | 5/2023 | ........... H10D 84/834 |

* cited by examiner

CELL INCLUDING INDIVIDUAL SOURCE REGIONS AND INTEGRATED CIRCUIT INCLUDING THE CELL

CROSS-REFERENCE TO RELATED APPLICATION

This application is based on and claims priority under 35 U.S.C. § 119 to Korean Patent Application No. 10-2021-0146061, filed on Oct. 28, 2021, in the Korean Intellectual Property Office, the disclosure of which is incorporated herein in its entirety by reference.

BACKGROUND

1. Field

The disclosure relates generally to an integrated circuit, and more particularly, to an integrated circuit based on standard cells.

2. Description of Related Art

An integrated circuit may be designed based on cells, e.g., standard cells. In detail, a layout of an integrated circuit may be generated by arranging standard cells according to data defining the integrated circuit and routing arranged the standard cells. Recently, the configuration of integrated circuits has become complicated, and semiconductor manufacturing processes are being extremely miniaturized. As semiconductor manufacturing processes are miniaturized, not only does a standard cell include reduced-sized patterns in a plurality of layers, but also the size of a standard cell is decreasing. Therefore, the difficulty of an integrated circuit manufacturing process increases, and performance improvement thereof is limited.

SUMMARY

Provided are cell capable of improving the performance of a cell without developing an additional process and an integrated circuit including the cell.

Additional aspects will be set forth in part in the description which follows and, in part, will be apparent from the description, or may be learned by practice of the presented embodiments.

In accordance with an aspect of an example embodiment of the disclosure, a cell including individual source regions may include active regions extending in a first direction and being spaced apart from each other in a second direction different from the first direction, gate lines extending across the active regions in the second direction and being spaced apart from each other in the first direction, first contacts arranged on both sides of each of the gate lines in the first direction and connected to the active regions, metal lines arranged over the gate lines and the first contacts, the metal lines extending in the first direction and being spaced apart from each other in the second direction, second contacts connecting the gate lines to the metal lines, and vias connecting the first contacts to the metal lines. Two gate lines of the gate lines adjacent to each other in the first direction may include a first interval or a second interval greater than the first interval therebetween, and a source isolation structure extending in the second direction may be provided between the two gate lines adjacent to each other at the second interval, and an individual source region respectively corresponding to the two gate lines through the source isolation structure may be provided in the active regions.

In accordance with an aspect of an example embodiment of the disclosure, an integrated circuit may include cells arranged in a first direction and a second direction different from the first direction, where each of the cells includes active regions extending in the first direction and being spaced apart from each other in the second direction, gate lines extending across the active regions in the second direction and being spaced apart from each other in the first direction, first contacts arranged on both sides of each of the gate lines in the first direction and connected to the active regions, metal lines arranged over the gate lines and the first contacts, the metal lines extending in the first direction and being spaced apart from each other in the second direction, second contacts connecting the gate lines to the metal lines, and vias connecting the first contacts to the metal lines. Two gate lines of the gate lines adjacent to each other in the first direction may include a first interval or a second interval greater than the first interval therebetween, and a source isolation structure extending in the second direction may be provided between the two gate lines adjacent to each other at the second interval, and an individual source region respectively corresponding to the two gate lines through the source isolation structure may be provided in the active regions.

In accordance with an aspect of an example embodiment of the disclosure, an integrated circuit may include cells arranged in a first direction and a second direction different from the first direction, wherein the cells are separated from each other in the first direction by a single diffusion break (SDB) structure, where each of the cells may include a first active region and a second active region extending in the first direction and being spaced apart from each other in the second direction, gate lines extending across the first active region and the second active region in the second direction and being spaced apart from each other in the first direction, and metal lines arranged over the gate lines, extending in the first direction, and being spaced apart from each other in the second direction. Two gate lines of the gate lines adjacent to each other in the first direction may include a first interval or a second interval twice the first interval therebetween. A source isolation structure extending in the second direction may be provided between the two gate lines adjacent to each other at the second interval, and an individual source region respectively corresponding to the two gate lines through the source isolation structure may be formed in the first active region and the second active region.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF THE EMBODIMENTS

Hereinafter, embodiments of the present disclosure will be described with reference to the accompanying drawings. The embodiments described herein are example embodiments, and thus, the disclosure is not limited thereto and may be realized in various other forms. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1A:
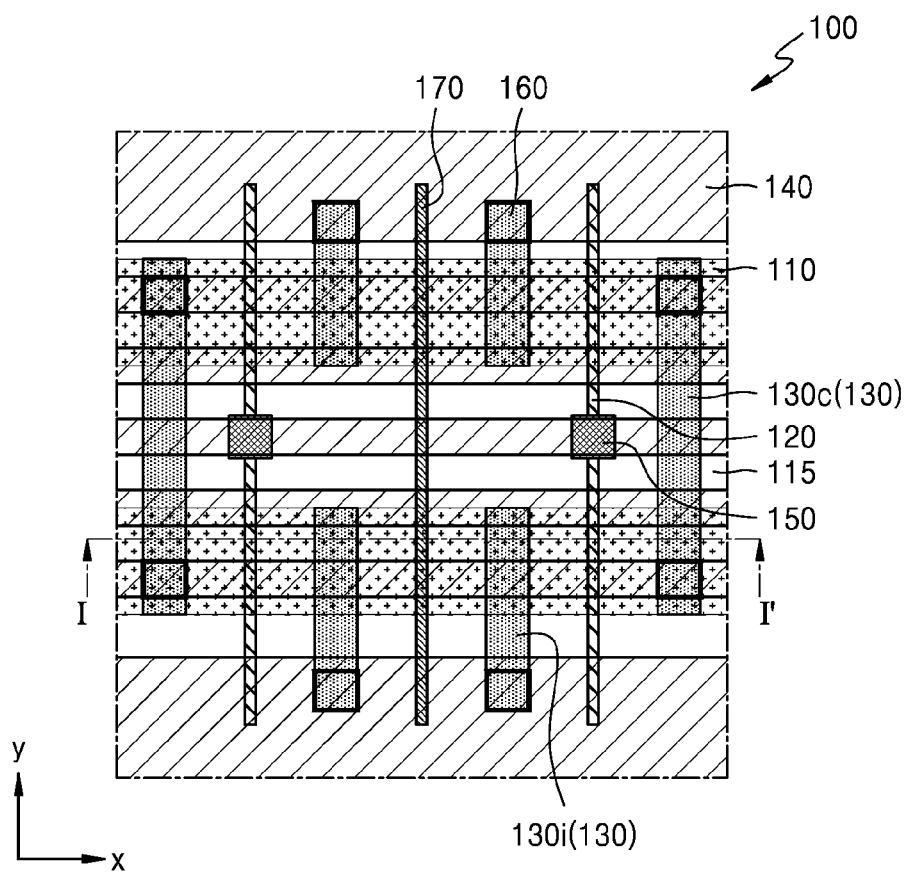
FIGS. 1A and 1B are diagrams of a cell including an individual source region according to an embodiment of and a cell of a comparative example.
Figure 1B:
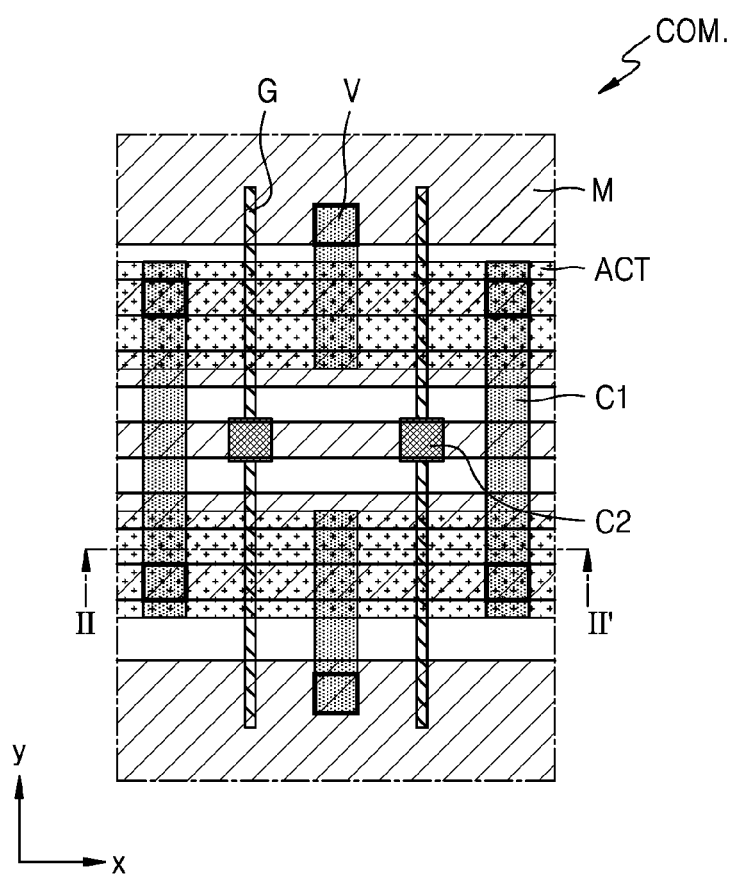
Figure 2A:
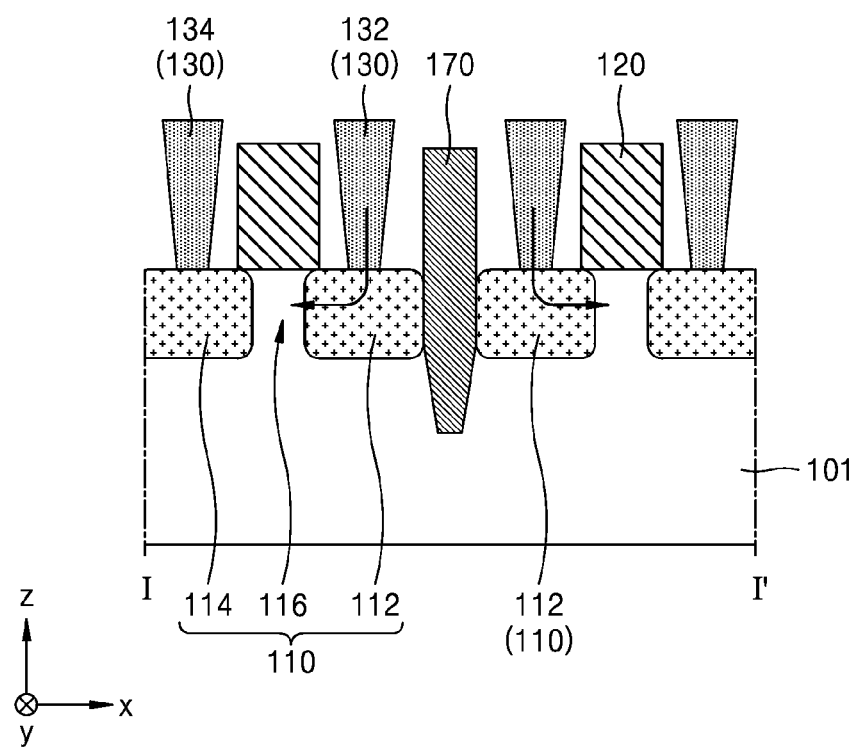
FIG. 2A is a cross-sectional view of a portion I-I' of the cell of FIG. 1A according to an embodiment.
Figure 2B:
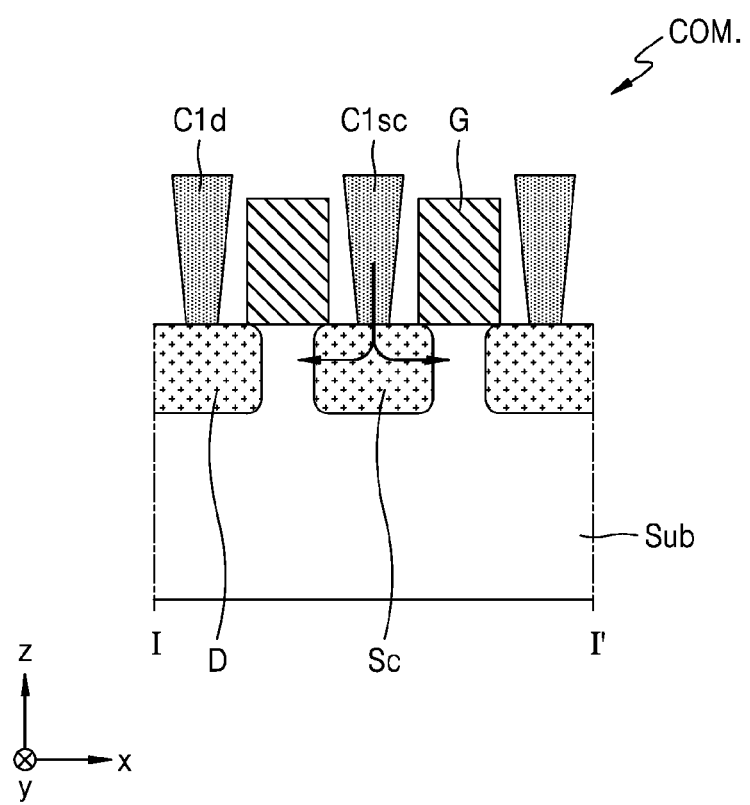
FIG. 2B is a cross-sectional view of a portion II-IF of the cell of FIG. 1B.

FIGS. 1A and 1B are diagrams showing layouts of a cell including an individual source region according to an embodiment and a cell of a comparative example. FIG. 2A is a cross-sectional view of a portion I-I' of the cell of FIG. 1A according to an embodiment. FIG. 2B is a cross-sectional view of a portion II-IF of the cell of FIG. 1B.

Referring to FIGS. 1A to 2B, a cell 100 including an individual source region according to an embodiment (hereinafter, simply referred to as a 'cell') may include a semiconductor substrate 101, active regions 110, gate lines 120, first contacts 130, metal lines 140, second contacts 150, vias 160, and a source isolation structure 170.

The semiconductor substrate 101 may include silicon (Si), e.g., monocrystalline silicon, polycrystalline silicon, or amorphous silicon. However, the material constituting the semiconductor substrate 101 is not limited to silicon. For example, in some embodiments, the semiconductor substrate 101 may include a group IV semiconductor like germanium (Ge), a group IV-IV compound semiconductor like silicon germanium (SiGe) or silicon carbide (SiC), or a group III-V compound semiconductor like gallium arsenide (GaAs), indium arsenide (InAs), and indium phosphide (InP).

The active regions 110 may be formed on the semiconductor substrate 101. The active regions 110 may extend in a first direction (x direction) and may be spaced apart from each other in a second direction (y direction). The active regions 110 adjacent in the second direction (y direction) may be separated from each other through a device isolation layer 115 like a deep trench isolation (DTI). The device isolation layer 115 may include, for example, an oxide, a nitride, or an oxynitride. In the cell 100 of the present embodiment, the active region 110 on the upper side in the second direction (y direction) may be a p-type metal-oxide semiconductor (PMOS) region, and the active region 110 on the lower side may be an n-type metal-oxide semiconductor (NMOS) region. In other words, the active region 110 on the upper side may constitute PMOS transistors together with the gate lines 120, and the active region 110 on the lower side may constitute NMOS transistors together with the gate lines 120.

The active regions 110 may each include a source region 112 and a drain region 114, which are densely doped regions on both sides of each of the gate lines 120 in the first direction (x direction), and a channel region 116 between the source region 112 and the drain region 114. The active regions 110 may have various structures and may constitute transistors having various structures. For example, the active regions 110 may constitute a planar field effect transistor (FET), a fin-FET, or a multi-bridge channel (MBC) FET (MBC-FET). The structure of the planar FET, the fin-FET, and the MBC-FET will be described later in more detail in the descriptions of FIGS. 3A to 3C.

The gate lines 120 may extend across the active regions 110 and the device isolation layer 115 in the second direction (y direction) and may be spaced apart from each other in the first direction (x direction). In the first direction (x direction), a source region 112 may be disposed on any one side of a gate line 120, the drain region 114 may be disposed on the other side of the gate line 120, and the channel region 116 may be disposed on a portion of the bottom surface of the gate line 120 between the source region 112 and the drain region 114. For example, in the case of the gate line 120 on the left side of the source isolation structure 170, the drain region 114 may be disposed on the left side and the source region 112 may be disposed on the right side. Also, in the case of the gate line 120 on the right side of the source isolation structure 170, the source region 112 may be disposed on the left side and the drain region 114 may be disposed on the right side.

In the cell 100 of the present embodiment, the gate lines 120 may be arranged in the first direction (x direction), and individual source regions 112 may be arranged in correspondence to the gate lines 120, respectively. For example, in the cell 100 of the present embodiment, the source region 112 may be disposed on the left side of the source isolation structure 170 in correspondence to the gate line 120 on the left side of the source isolation structure 170, and the source region 112 may be disposed on the right side of the source isolation structure 170 in correspondence to the gate line 120 on the right side of the source isolation structure 170. As shown in FIG. 1A or 2A, the gate lines 120 and the source isolation structure 170 may be arranged at substantially the same interval in the first direction (x direction). This may be due to the source isolation structure 170 being formed in an SDB structure. The SDB structure of the source isolation structure 170 will be described later in more detail in the descriptions of FIGS. 4A and 4B. An interval between two components adjacent to each other may be defined based on the center lines of the corresponding components when widths of the corresponding components are different from each other.

The first contacts 130 may contact the active regions 110 and may extend in the second direction (y direction) with a certain length. For example, the first contacts 130 may include individual contacts 130i that contact the respective active regions 110 and common contacts 130c that contact the active regions 110 in common. Also, the first contacts 130 may include source contacts 132 each contacting the source region 112 and drain contacts 134 each contacting the drain region 114. As shown in FIG. 1A, the source contact 132 may correspond to an individual contact 130i and the drain contact 134 may correspond to a common contact 130c. However, the types of the source contact 132 and the drain contact 134 are not limited thereto. For example, in other embodiments, the drain contact 134 may also correspond to the individual contact 130i.

The metal lines 140 may be arranged on the gate lines 120 and the first contacts 130, may extend in the first direction (x direction), and may be spaced apart from one another in the second direction (y direction). In the cell 100 of the present embodiment, the metal lines 140 may include a power line, which is the topmost line in the second direction (y direction), a ground line, which is the bottommost line in the second direction (y direction), and intermediate lines between the power line and the ground line. As shown in FIG. 1A, the width of each of the power line and the ground line in the second direction (y direction) may be greater than the width of an intermediate line. For example, the width of each of the power line and the ground line in the second direction (y direction) may be about three times the width of an intermediate line. In other embodiments, the positions of the power line and the ground line may be reversed. For example, when it is assumed that a plurality of cells are arranged in the second direction (y direction), power lines and ground lines may be alternately arranged in the second direction (y direction).

The second contacts 150 may be arranged on the gate lines 120. The second contacts 150 may connect the gate lines 120 to the metal lines 140, e.g., the intermediate lines.

The vias 160 may be arranged on the first contacts 130. The vias 160 may connect the first contacts 130 to the metal lines 140. For example, the vias 160 may connect the first contacts 130 to a power line or a ground line. Also, the vias 160 may connect the first contacts 130 to intermediate lines. As the first contacts 130 are connected to the metal lines 140 through the vias 160, corresponding active regions 110 may be electrically connected to the metal lines 140.

The source isolation structure 170 may be disposed between two source regions 112 adjacent to each other in the first direction (x direction) and may extend in the second direction (y direction). The source isolation structure 170 may have an SDB structure, and the active regions 110 in the upper portion and the lower portion may each be divided into two regions in the first direction (x direction) by the source isolation structure 170. As the source region 112 is divided into two regions by the source isolation structure 170, the individual source regions 112 respectively corresponding to the gate lines 120 may be arranged.

The cell 100 of the present embodiment may correspond to, for example, a standard cell, and thus the cell 100 may be used as a basic layout when designing an integrated circuit. To describe a standard cell in more detail, as the integration of semiconductor devices is increasing recently, significant time and costs are needed to design an integrated circuit, and more particularly, a layout for a device region. Therefore, as a technique for reducing the time and the costs, a technique for designing a layout based on standard cells may be used. The technique for designing a layout based on standard cells may reduce time needed for designing a layout by designing repeatedly used logic devices like an OR gate or an AND gate as standard cells and storing in a computer system in advance and placing and wiring the standard cells where needed when a layout is designed.

For example, a standard cell may include a basic cell such as an AND, an OR, a NOR, an inverter, and a NAND, a complex cell such as an OAI (OR/AND/inverter) and an AOI (AND/OR/inverter), and a storage element like a simple master-slave flip-flop and a latch.

A standard cell method refers to a method of designing a dedicated large-scale integrated circuit (LSI) customized to a demand of a customer or a user by preparing logic circuit blocks, that is, cells, having various functions in advance and combining these cells arbitrarily. Cells may be pre-registered in a computer after being designed and verified in advance, and logic design, arrangement, and wiring may be performed by combining registered cells through a computer aided design (CAD).

In detail, in the case of designing/manufacturing a large-scale integrated circuit, when standardized logic circuit blocks (i.e., standard cells) of a certain size are already stored in a library, an entire circuit may be designed by selecting standard cells suitable for a current design purpose from a library, arranging selected logic circuit blocks as a plurality of cells on a chip, and forming optimal wires with the shortest lengths in wiring spaces between the cells. The more the types of cells stored in the library, the greater the design flexibility and the possibility of an optimal design of a chip may be.

In the cell 100 of the present embodiment, the source isolation structure 170 is disposed as a structure that isolating the two source regions 112, and thus individual source regions 112 respectively corresponding to the gate lines 120 may be arranged. As described above, by arranging the individual source regions 112 in correspondence to the respective gate lines 120, the performance of the cell 100 may be significantly improved.

In detail, in a cell COM of the comparative example of FIG. 1B ('COM' indicating the comparative example), when there is no source isolation structure, a common source region Sc may be disposed between two gate lines G adjacent to each other, and a common source contact C1sc may be connected to the common source region Sc. Therefore, as indicated by the arrow, a current from the common source contact C1sc is split and flows to two drain regions D through channel regions below gate lines G on both sides, and thus the operation speed of a cell may be lowered. On the contrary, in the case of the cell 100 of the present embodiment, individual source regions 112 respectively corresponding to the gate lines 120 on both sides are arranged due to the source isolation structure 170, and also individual source contacts 132 may be connected to the individual source regions 112, respectively. Therefore, as indicated by the arrow, a current from each individual source contacts 132 flows to a drain region D through a channel region below a corresponding gate line 120, and thus the operation speed of a cell may be increased. For example, it may be confirmed that the operating speed of the cell 100 of the present embodiment is increased as compared to that of the cell COM of the comparative example. In the cell 100 of the present embodiment, the source isolation structure 170 may have an SDB structure. Accordingly, the total area of the cell 100 may not increase significantly. Incidentally, in the cell COM of the comparative example, Sub may indicate a semiconductor substrate, C1d may indicate a drain contact, M may indicate a metal line, C1 and C2 may respectively indicate a first contact and a second contact, and V may indicate a via.

For reference, to improve the performance of a cell, capacitance and/or resistance needs to be reduced. To this end, process modifications like changes or improvements in structure, material, and scheme are commonly performed. However, as process difficulty gradually increases due to recent scaling, it is very difficult to improve the performance through process changes, and process changes may need significant amount of time, cost, and effort.

However, the performance of the cell 100 according to the present embodiment may be improved through a simple layout change without an additional process change. Therefore, there is no need for additional cost or time for a process change or an improvement. In detail, in the case of the cell 100 of the present embodiment, by introducing the source isolation structure 170 to split a common source region into the individual source regions 112, the resistance may be greatly reduced. In other words, since the common source region is split and the area of source region is doubled, the resistance is greatly reduced, and thus the operating speed of the cell 100 may be improved. For example, simulation evaluation results show that the operating speed of the cell 100 of the present embodiment including individual source regions is improved by approximately 5% or more as compared to a cell including a common source region. Also, in the cell 100 of the present embodiment, as the source isolation structure 170 is formed to have an SDB structure, a parasitic capacitor that may be caused by gate lines may be minimized.

Figure 3A:
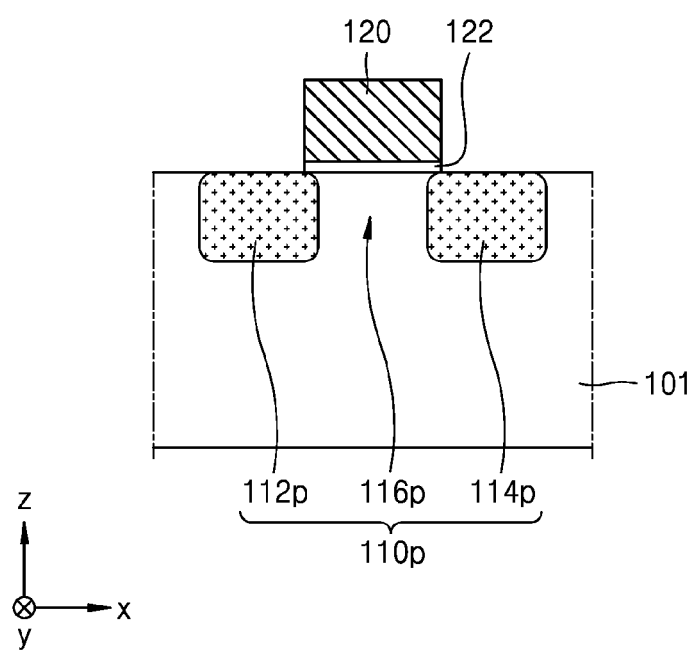
FIGS. 3A, 3B and 3C are cross-sectional views of various structures of an active region in the cell of FIG. 1A according to an embodiment.
Figure 3B:
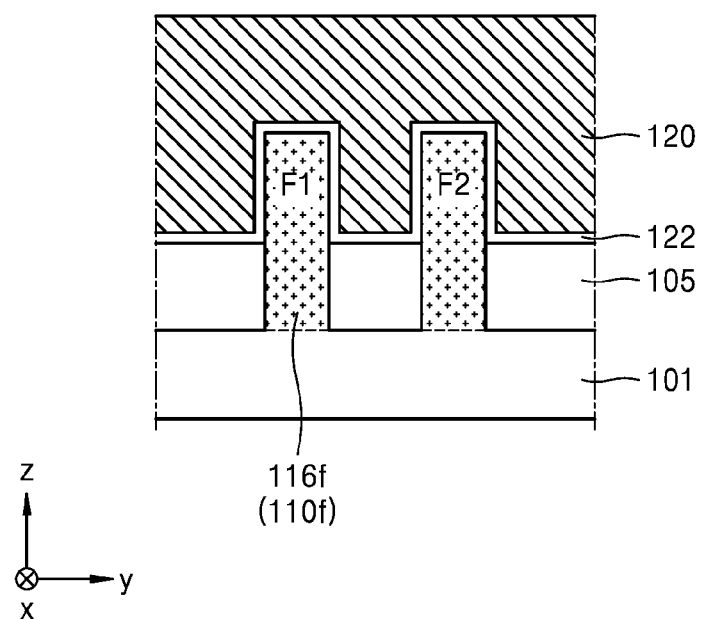
Figure 3C:
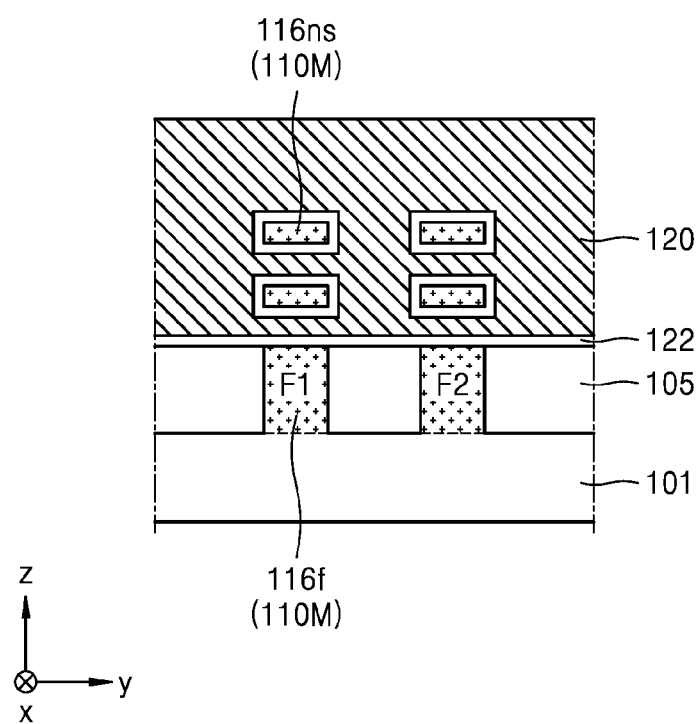

FIGS. 3A to 3C are cross-sectional views of various structures of an active region in the cell of FIG. 1A according to an embodiment. Descriptions of FIGS. 3A to 3C will be given below with reference to FIGS. 1A to 2B, and descriptions identical to those already given above with reference to FIGS. 1A to 2B will be briefly given or omitted.

Referring to FIG. 3A, in the cell 100 of the present embodiment, an active region 110$p$ may have a planar structure and constitute a planar FET. For example, the planar FET may include the active region 110$p$ having a planar structure and the gate line 120. The active region 110$p$ may include a source region 112$p$ and a drain region 114$p$, which are densely doped regions arranged in the upper portion of a semiconductor substrate 101, and a channel region 116$p$ between the source region 112$p$ and the drain region 114$p$. The active region 110$p$ having the planar structure may extend in the first direction (x direction), and the level of the top surface thereof may be substantially the same as the level of the top surface of the semiconductor substrate 101.

The gate line 120 may be disposed on the channel region 116$p$ via a gate insulating layer 122 interposed therebetween and may extend in the second direction (y direction). The gate line 120 and the gate insulating layer 122 may be formed through a metal-replacement process or a gate last process. Therefore, the gate line 120 may be formed as a metal layer and may have a single layer structure or multi-layer structure. For example, the gate line 120 may include a lower metal layer and an upper metal layer. The lower metal layer may include, for example, at least one of TiN, WN, TiAl, TiAlN, TaN, TiC, TaC, TaCN, TaSiN, and a combination thereof. Also, the upper metal layer may include, for example, at least one of W, Al, Co, Ti, Ta, poly-Si, SiGe, or a metal alloy. The gate insulating layer 122 may include a high-k material having a dielectric constant higher than that of silicon oxide. For example, the gate insulating layer 122 may include $HfO_2$, $ZrO_2$, LaO, $Al_2O_3$, $Ta_2O_5$, etc.

Referring to FIG. 3B, in the cell 100 of the present embodiment, an active region 110$f$ may have a structure including fins 116$f$ and constitute a fin-FET. For example, the fin-FET may include the active region 110$f$ including the fins 116$f$ and the gate line 120. The active region 110$f$ may include the fins 116$f$ that protrude in a third direction (z direction) perpendicular to the top surface of the semiconductor substrate 101, extend in the first direction, and are spaced apart from each other in the second direction, e.g., a first fin F1 and a second fin F2. Here, the first direction may be an x-direction and the second direction may be a y-direction perpendicular to the x-direction. Although two fins 116$f$ are shown in FIG. 3B, the active region 110$f$ may include one fin 116$f$ or three or more fins 116$f$ spaced apart from one another in the second direction (y direction). The fins 116$f$ may be a portion of the semiconductor substrate 101. Also, the fins 116$f$ may include an epitaxial layer grown from the semiconductor substrate 101. In some embodiments, the fins 116$f$ may include Si, SiGe, etc.

A device isolation layer 105 like a shallow trench isolation (STI) may be disposed between the fins 116$f$. For example, the device isolation layer 105 may cover lower sidewalls of the fins 116$f$ and may not cover upper sidewalls of the fins 116$f$. The device isolation layer 105 may include, for example, an oxide, a nitride, or an oxynitride. For reference, as compared to the device isolation layer 115 separating the active region 110 on the upper side and the active region 110 on the lower side in the second direction (y direction) in FIG. 1A, the device isolation layer 105 separating the fins 116$f$ may have a relatively low bottom surface level.

The active region 110$f$ may include a source region and a drain region, which are densely doped regions arranged on both sides of the gate line 120 in the first direction (x direction), and a channel region surrounded on three sides by the gate line 120. The channel region may be constituted by upper portions of the fins 116$f$. The source region and the drain region may be formed through an epitaxial layer growth or may be formed by using the fins 116$f$.

The gate line 120 may cover the upper portions of the fins 116$f$ via the gate insulating layer 122 interposed therebetween and may extend in the second direction (y direction). The gate line 120 and the gate insulating layer 122 may be formed through a metal-replacement process. Materials constituting the gate line 120 and the gate insulating layer 122 are the same as those described above.

Referring to FIG. 3C, in the cell 100 of the present embodiment, an active region 110M may have a structure including a nanosheet 116$ns$ and constitute an MBC-FET. For example, an MBC-FET may include active regions 110M, which include nanosheets 116$ns$ over the fins 116$f$, and the gate line 120. The active region 110M may include a source region and a drain region, which are densely doped regions arranged on both sides of the gate line 120 in the first direction (x direction), and a channel region surrounded on four sides by the gate line 120. A channel region may include the nanosheets 116$ns$ on the fins 116$f$.

As compared to a fin-FET, upper portions of fins constitute a channel region in the fin-FET, and thus the gate line 120 may have a tri-gate structure in which a gate covers the top surface and upper portions of both side surfaces of a fin. On the contrary, in the case of an MBC-FET, the nanosheets 116$ns$ constitute a channel region, and thus the gate line 120 may have a gate-all-around (GAA) structure in which a gate surrounds four side surfaces of the nanosheets 116$ns$. Although two fins 116$f$ are shown in FIG. 3C, the active region 110$f$ may include one fin 116$f$ or three or more fins 116$f$ spaced apart from one another in the second direction (y direction). Also, although two nanosheets 116$ns$ are arranged on each of the fins 116$f$, one nanosheet 116$ns$ may be disposed on each of the fins 116$f$ or three or more nanosheets 116$ns$ may be arranged on each of the fins 116$f$.

The gate line 120 may extend in the second direction (y direction) while covering the top surfaces of the fins 116$f$ and side surfaces of the nanosheets 116$ns$ via the gate insulating layer 122 interposed therebetween. The gate line 120 and the gate insulating layer 122 may be formed through a metal-replacement process.

Figure 4A:
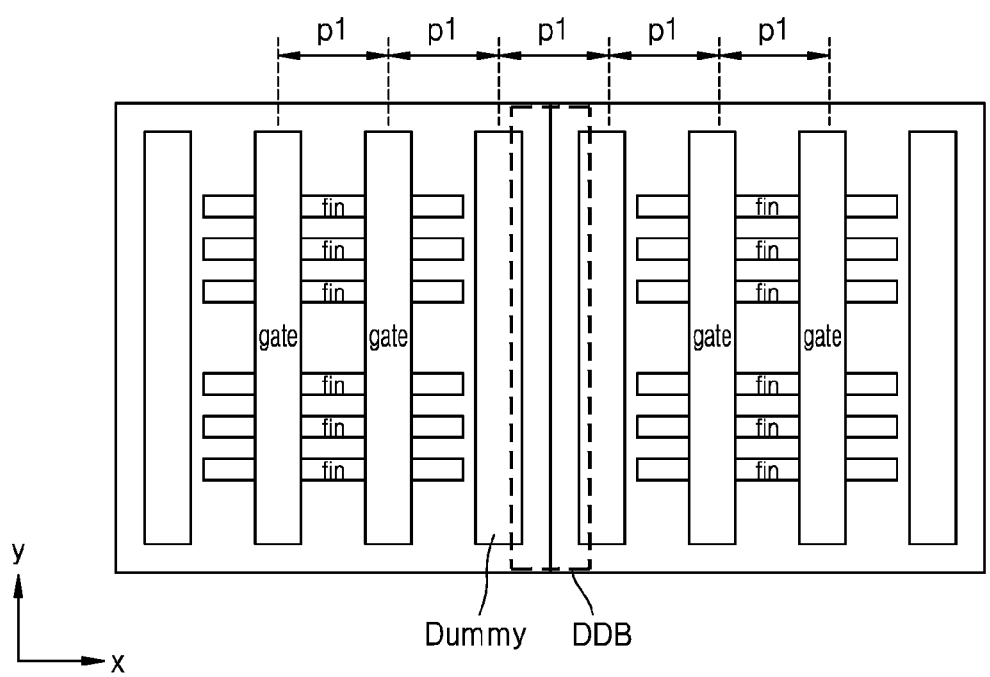
FIGS. 4A and 4B are diagrams showing layouts of cells for describing differences between a double diffusion break (DDB) structure and a single diffusion break (SDB) structure according to an embodiment.
Figure 4B:
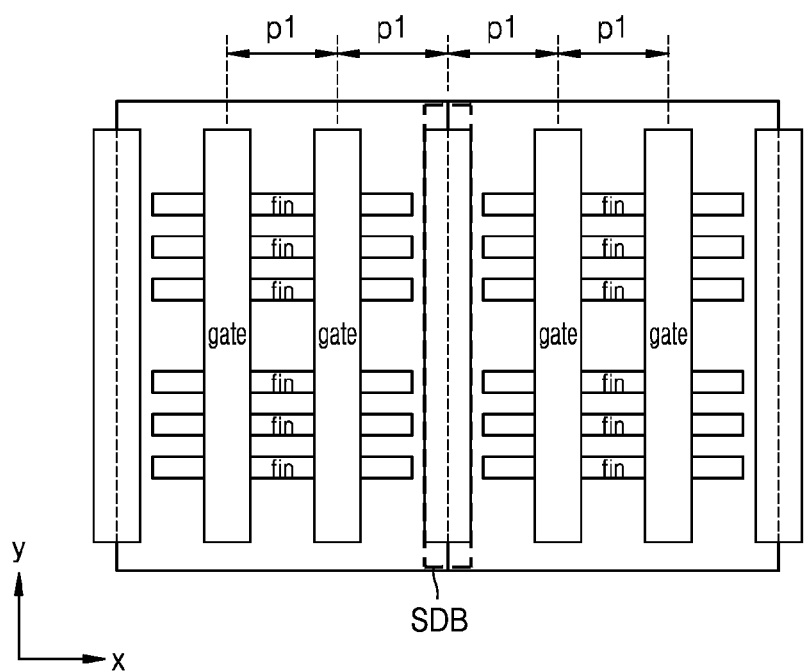

FIGS. 4A and 4B are diagrams showing layouts of cells for describing differences between a double diffusion break (DDB) structure and an SDB structure according to an embodiment.

Referring to FIG. 4A, the DDB structure may be formed across two gate lines. For example, the DDB structure may be formed by disposing an insulating layer as a buried structure under two gate lines adjacent to each other in the first direction (x direction). Therefore, as indicated by dotted lines, the DDB structure has a width corresponding to a first pitch p1 between gate lines in the first direction (x direction), and, in the DDB structure, two upper gate lines may correspond to dummy gates.

Referring to FIG. 4B, the SDB structure may have substantially the same width as that of a gate line in the first direction (x direction). For example, the SDB structure may have a structure in which an insulation layer having substantially the same width as that of the gate line extends into a semiconductor substrate and separate an active region. Therefore, the SDB structure may have a width corresponding to the width of a gate line in the first direction (x direction), as indicated by the dotted lines. Also, in the SDB structure, unlike in the DDB structure, there is no separate dummy gate, and an upper portion of an insulating layer constituting the SDB structure may protrude from the semiconductor substrate in correspondence to the structure of a gate line.

In consideration of the area of a cell, two cells including the DDB structure may be larger than two cells including the SDB structure in the first direction (x direction) by the first pitch p1. Therefore, cells including the SDB structure may be advantageous in terms of area. Insulating layers constituting the DDB structure and the SDB structure may include a compressive stress material and/or a tensile stress material. Here, the compressive stress material is a material capable of applying compressive stress to an active region, and the tensile stress material is a material capable of applying tensile stress to an active region. For example, an insulation layer having the SDB structure may include silicon nitride, and an insulation layer having the DDB structure may include a material like tetraethyl orthosilicate (TEOS). However, materials constituting insulation layers having the DDB structure and the SDB structure are not limited to the above-described materials.

Figure 5A:
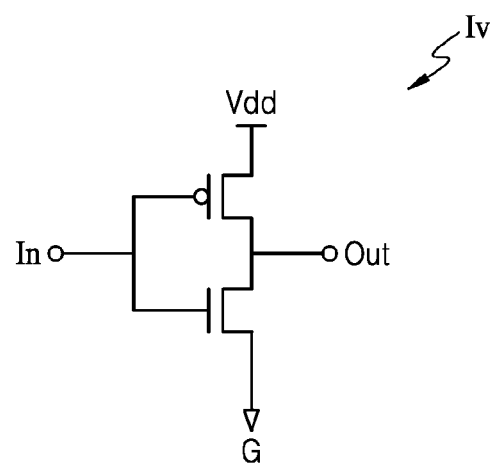
FIG. 5A is a circuit diagram of a cell including individual source regions according to an embodiment.
Figure 5B:
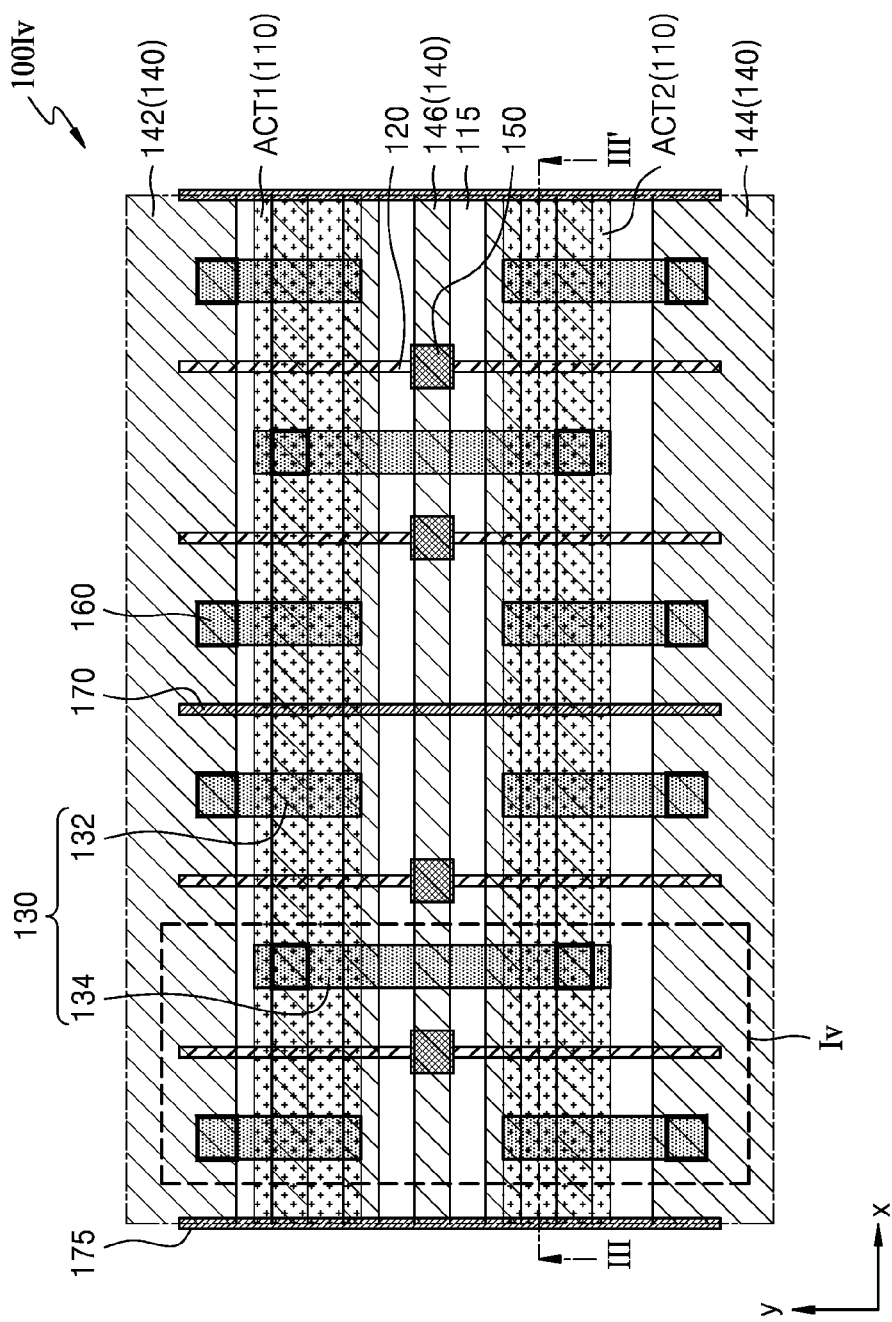
FIG. 5B is a layout diagram of a cell including individual source regions according to an embodiment.
Figure 5C:
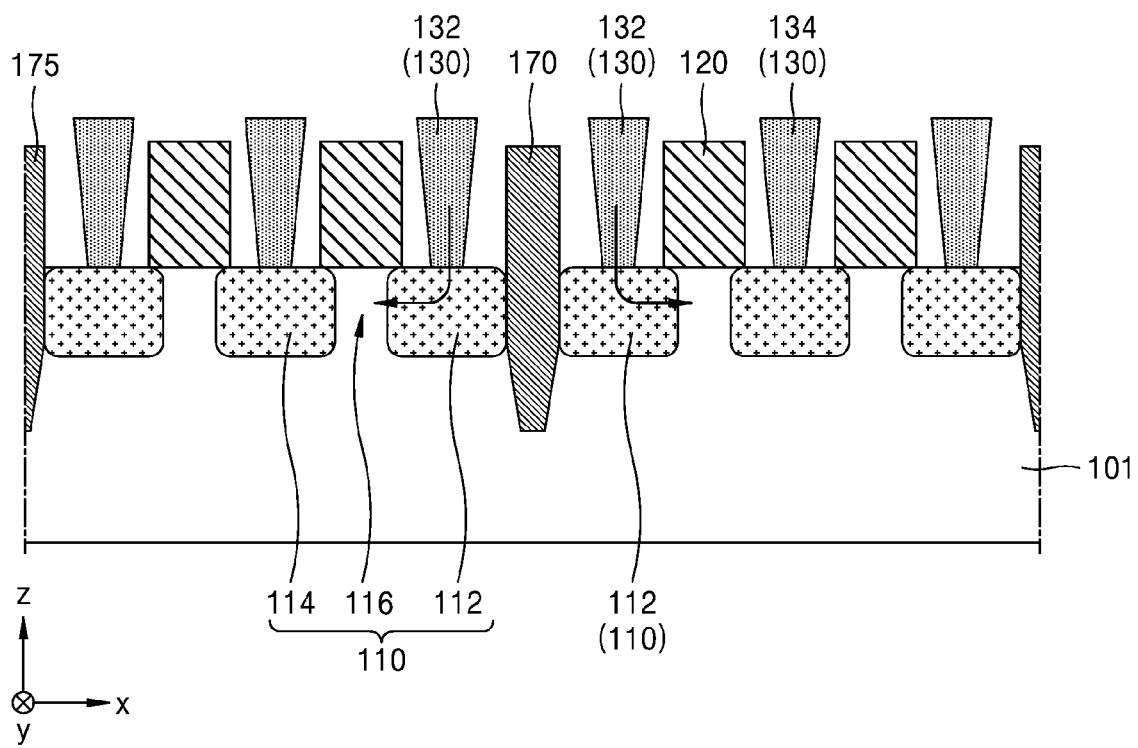
FIG. 5C is a cross-sectional view of a cell including individual source regions according to an embodiment.

FIG. 5A is a circuit diagram of a cell including individual source regions according to an embodiment. FIG. 5B is a layout diagram of a cell including individual source regions according to an embodiment. FIG. 5C is a cross-sectional view of a cell including individual source regions according to an embodiment. FIG. 5A is a circuit diagram of an individual inverter, FIG. 5B is a layout diagram of an inverter standard cell, and FIG. 5C is a cross-sectional view taken along a line III-III' of FIG. 5B. Descriptions already given above with reference to FIGS. 1A to 4B will be briefly given or omitted.

Referring to FIGS. 5A to 5C, a cell 100Iv of the present embodiment is an inverter standard cell including an individual source region and may have a structure in which four inverters are connected in parallel. As shown in FIG. 5A, an individual inverter Iv may include a PMOS and an NMOS connected in series, wherein a common gate of the PMOS and the NMOS may be an input In, and a common drain region may be an output Out. Also, a power voltage may be applied to a source region of the PMOS, and a ground voltage may be applied to a source region of the NMOS.

The structure of an inverter standard cell including the cell 100Iv of the present embodiment will be described below in more detail. The inverter standard cell may include the active regions 110, the gate lines 120, the first contacts 130, the metal lines 140, the second contacts 150, the vias 160, and the source isolation structure 170.

The active regions 110 may include a first active region ACT1 and a second active region ACT2. The first active region ACT1 and the second active region ACT2 may each extend in the first direction (x direction) and may be apart from each other in the second direction (y direction). The device isolation layer 115 like a DTI may be disposed between the first active region ACT1 and the second active region ACT2. Also, the first active region ACT1 may constitute a PMOS, and the second active region ACT2 may constitute an NMOS. The first active region ACT1 and the second active region ACT2 may each constitute a planar FET, a fin-FET, or an MBC-FET.

As shown in FIG. 5C, the active regions 110 may each include the source region 112, the drain region 114, and the channel region 116 in correspondence to one gate line 120. In the inverter standard cell including the cell 100Iv of the present embodiment, as shown in the circuit diagram of FIG. 5A and the layout diagram of FIG. 5B, drain regions 114 of the PMOS and the NMOS may be connected to each other through the first contacts 130. Also, the drain region 114 of each of first active region ACT1 and the second active region ACT2 may be shared by two gate lines 120. In other words, the gate lines 120 arranged on both sides of the drain region 114 in the first direction (x direction) may use the drain region 114 in common. In the case of the source region 112, the individual source region 112 may be disposed on each of the gate lines 120 due to the source isolation structure 170.

The gate lines 120 may extend across the active regions 110 in the second direction (y direction) and may be spaced apart from each other in the first direction (x direction). Since one gate line 120 forms a PMOS in the first active region ACT1 and an NMOS in the second active region ACT2, one inverter Iv may be formed per one gate line 120. The inverter standard cell including the cell 100Iv of the present embodiment may include four gate lines 120, and thus, may have a structure in which four inverters Iv are connected in parallel.

The first contacts 130 may include source contacts 132 and drain contacts 134. Four source contacts 132 may be arranged in each of the first active region ACT1 and the second active region ACT2 in correspondence to the four gate lines 120. In detail, the source contacts 132 may be respectively arranged in the first active region ACT1 and the second active region ACT2 on the left side of a first gate line 120, the right side of a second gate line 120, the left side of a third gate line 120, and right side of a fourth gate line 120, wherein the first gate line 120, the second gate line 120, the third gate line 120, and the fourth gate line 120 are sequentially arranged from the left in the first direction (x direction). Also, two drain contacts 134 may be disposed and connect the drain region 114 of the first active region ACT1 to the drain region 114 of the corresponding second active region ACT2. In detail, the drain contacts 134 may be arranged in common in the first active region ACT1 and the second active region ACT2 between the first gate line 120 and the second gate line 120 and between the third gate line 120 and the fourth gate line 120.

The metal lines 140 may extend in the first direction (x direction) and may be spaced apart from each other in the second direction (y direction). The metal lines 140 may be arranged above the gate lines 120 and the first contact 130. The metal lines 140 may include a power line 142 disposed at the top in the second direction (y direction), a ground line 144 disposed at the bottom, and intermediate lines 146 arranged between the power line 142 and the ground line 144. The width of each of the power line 142 and the ground line 144 in the second direction (y direction) may be greater than the width of an intermediate line 146. The width of each of the power line 142 and the ground line 144 in the second direction (y direction) may be about 3 times the width of the intermediate line 146.

The second contacts 150 may connect the gate lines 120 to the metal lines 140, e.g., the intermediate lines 146. As shown in FIG. 5B, the second contacts 150 may be arranged at the centers of the gate lines 120 in the second direction (y direction). However, the positions of the second contacts 150 are not limited thereto.

The vias 160 may connect the first contacts 130 to the metal lines 140. In detail, the source contacts 132 arranged in the first active region ACT1 may be connected to the power line 142 through the vias 160. Also, the source contacts 132 arranged in the second active region ACT2 may be connected to the ground line 144 through the vias 160. Drain contacts 134 commonly arranged in the first active region ACT1 and the second active region ACT2 may be connected to the intermediate lines 146 through the vias 160.

The source isolation structure 170 may be disposed between the second gate line 120 and the third gate line 120. The source isolation structure 170 may be formed to have an SDB structure and may extend in the second direction (y direction). The first active region ACT1 and the second active region ACT2 may each be divided into two regions in the first direction (x direction) by the source isolation structure 170. Also, based on the source isolation structure 170, the individual source regions 112 may be arranged in correspondence to the respective gate lines 120.

In the inverter standard cell including the cell 100Iv of the present embodiment, the gate lines 120, the first contacts 130, the second contacts 150, and the vias 160 may have line-symmetric structures around the source isolation structure 170. Also, the cell 100Iv of the present embodiment may be separated from cells adjacent in the first direction (x direction) by a cell separation structure 175. The cell separation structure 175 may have an SDB structure. Cells 100Iv of the present embodiment may be arranged in the second direction (y direction). In this case, the metal lines 140 may be arranged in the manner that power lines 142 and ground lines 144 are alternately disposed in the second direction (y direction).

Figure 6A:
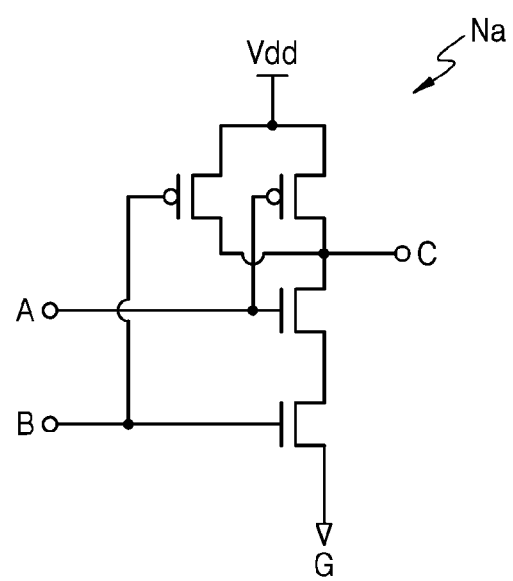
FIG. 6A is a circuit diagram of a cell including individual source regions according to an embodiment.
Figure 6B:
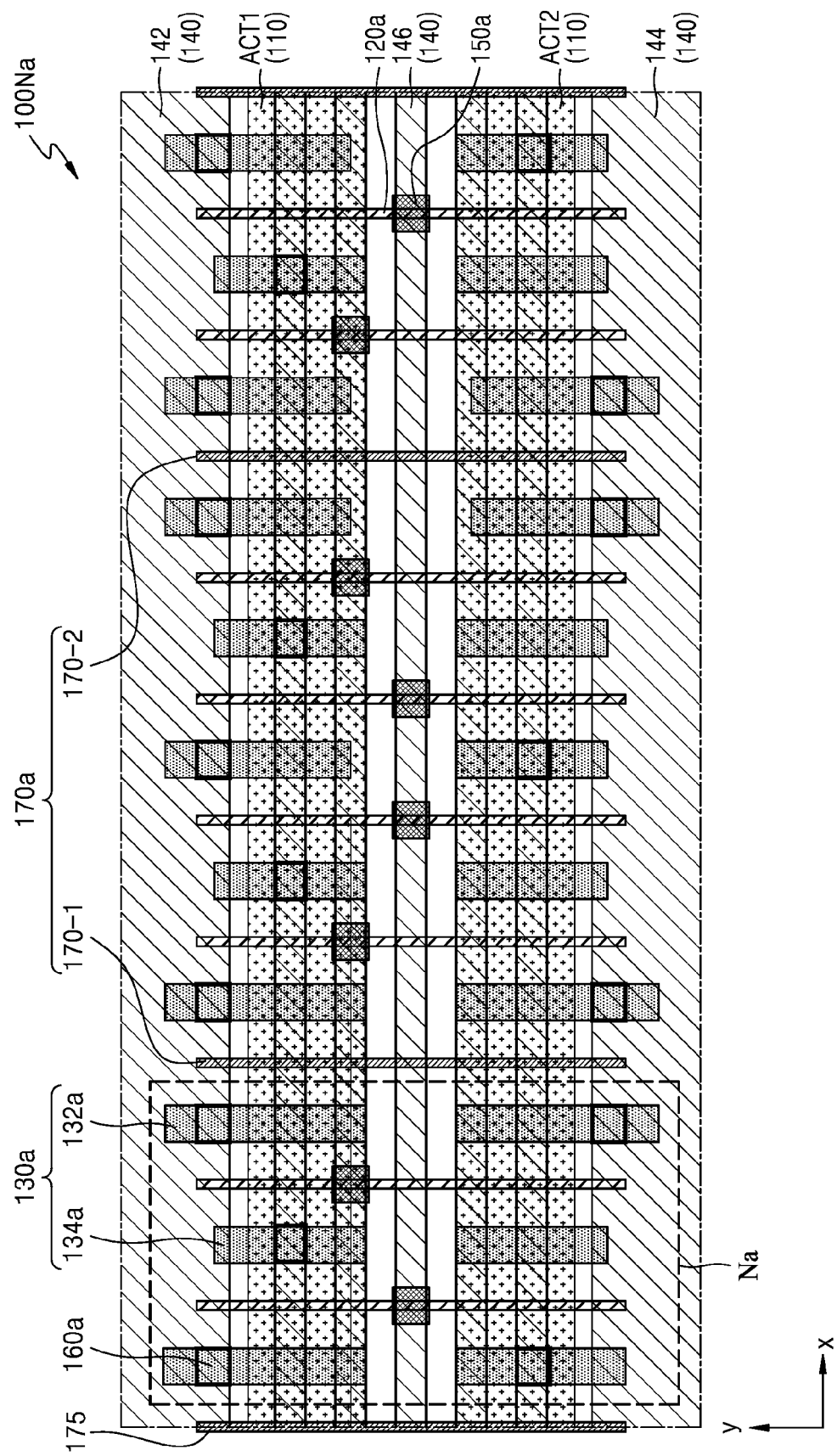
FIG. 6B is a layout diagram of a cell including individual source regions according to an embodiment.

FIG. 6A is a circuit diagram of a cell including individual source regions according to an embodiment. FIG. 6B is a layout diagram of a cell including individual source regions according to an embodiment. FIG. 6A is a circuit diagram for an individual NAND and FIG. 6B is a layout diagram for a NAND standard cell. Descriptions already given above with reference to FIGS. 1A to 4B will be briefly given or omitted.

Referring to FIGS. 6A and 6B, a cell 100Na of the present embodiment is a NAND standard cell including individual source regions and may have a structure in which four NANDs are connected in parallel. As shown in FIG. 6A, each NAND Na may include two PMOSs connected in parallel with each other and two NMOSs connected in series with each other, and the NMOSs may be connected to the PMOSs in series. Also, common gates of two PMOS and an NMOS may become inputs A and B, and a common drain region between a PMOS and an NMOS may become an output C. A power voltage may be applied to source regions of the two PMOSs, and a ground voltage may be applied to a source region of a lower NMOS.

The structure of a NAND standard cell including the cell 100Na of the present embodiment will be described below in more detail. The NAND standard cell may include the active regions 110, gate lines 120a, first contacts 130a, the metal lines 140, second contacts 150a, vias 160a, and a source isolation structure 170a.

The active regions 110 may include the first active region ACT1 and the second active region. The first active region ACT1 and the second active region ACT2 may each extend in the first direction (x direction) and may be apart from each other in the second direction (y direction). The device isolation layer 115 like a DTI may be disposed between the first active region ACT1 and the second active region ACT2. Also, the first active region ACT1 may constitute a PMOS, and the second active region ACT2 may constitute an NMOS. The first active region ACT1 and the second active region ACT2 may each constitute a planar FET, a fin-FET, or an MBC-FET.

The active regions 110 may each include a source region, a drain region, and a channel region in correspondence to one gate line 120a. In the NAND standard cell including the cell 100Na of the present embodiment, a drain region of a PMOS may be connected to a source region of an NMOS through the first contacts 130a, the metal lines 140, and the vias 160a. In detail, a source contact 132a of the second active region ACT2 on the left side of a first gate line 120a from the left in the first direction (x direction) may be connected to a drain contact 134a of the first active region ACT1 on the right side of the first gate line 120a through the vias 160a and the metal lines 140, e.g., the intermediate lines 146.

Also, a drain region of each of first active region ACT1 and the second active region ACT2 may be shared by two gate lines 120a. In other words, the gate lines 120a arranged on both sides of the drain region in the first direction (x direction) may use the drain region in common. In the case of a source region, an individual source region may be disposed on each of the gate lines 120a due to the source isolation structure 170a.

The gate lines 120a may extend across the active regions 110 in the second direction (y direction) and may be spaced apart from each other in the first direction (x direction). One gate line 120a may constitute a PMOS in the first active region ACT1 and constitute an NMOS in the second active region ACT2. Also, since two adjacent gate lines 120a constitute two PMOSs connected in parallel in the first active region ACT1 and two NMOSs connected in series in the second active region ACT2, one NAND Na may be configured per two gate lines 120a. The NAND standard cell including the cell 100Na of the present embodiment may include eight gate lines 120a, and thus, may have a structure in which four NAND Na are connected in parallel.

The first contacts 130a may include source contacts 132a and drain contacts 134a. Seven source contacts 132a may be arranged in each of the first active region ACT1 and the second active region ACT2 in correspondence to the eight gate lines 120a. In detail, the source contacts 132a may be respectively arranged in the first active region ACT1 and the second active region ACT2 on the left side of a first gate line 120a, the right side of a second gate line 120a, the left side of a third gate line 120a, the right side of a fourth gate line 120a, the right side of a sixth gate line 120a, the left side of a seventh gate line 120a, and the right side of an eighth gate line 120*a*, wherein the first gate line 120*a*, the second gate line 120*a*, the third gate line 120*a*, the fourth gate line 120*a*, the sixth gate line 120*a*, the seventh gate line 120*a*, and the eighth gate line 120*a* are sequentially arranged from the left in the first direction (x direction). Also, the drain contacts 134*a* may be respectively arranged in the first active region ACT1 and the second active region ACT2 on the right side of the first gate line 120*a*, the left side of the third gate line 120*a*, the right side of a fifth gate line 120*a*, and right side of the seventh gate line 120*a*, wherein the first gate line 120*a*, the third gate line 120*a*, the fifth gate line 120*a*, and the seventh gate line 120*a* are sequentially arranged from the left in the first direction (x direction).

For reference, the source contacts 132*a* arranged in each of the first active region ACT1 and the second active region ACT2 between the fourth gate line 120*a* and fifth gate line 120*a* may correspond to two gate lines 120*a*. In other words, a source region may not be separated by a source isolation structure. In this case, since the source contact 132*a* of the first active region ACT1 is connected to the power line 142, performance improvement due to the a separation structure is significant. However, since the source contact 132*a* of the second active region ACT2 is connected to drain contacts 134*a* on both sides of the source contact 132*a* without being connected to the ground line 144, performance improvement due to the separation structure is not significant. Therefore, in consideration of the reduction in the area of a cell, a source region between the fourth gate line 120*a* and the fifth gate line 120*a* is not separated by a source isolation structure, and thus one source contact 132*a* may be disposed. As a result, in the NAND standard cell including the cell 100Na of the present embodiment, seven source contacts 132*a* may be arranged in each of the first active region ACT1 and the second active region ACT2 in correspondence to eight gate lines 120*a*. However, in other embodiments, by introducing an additional source isolation structure in consideration of performance improvement of a cell, nine source contacts 132*a* may be arranged in each of the first active region ACT1 and the second active region ACT2 in correspondence to eight gate lines 120*a*.

The metal lines 140 may extend in the first direction (x direction) and may be spaced apart from each other in the second direction (y direction). The metal lines 140 may be arranged above the gate lines 120*a* and a first contact 130*a*. The metal lines 140 may include a power line 142 disposed at the top in the second direction (y direction), a ground line 144 disposed at the bottom, and intermediate lines 146 arranged between the power line 142 and the ground line 144. The width of each of the power line 142 and the ground line 144 in the second direction (y direction) may be greater than the width of an intermediate line 146. The width of each of the power line 142 and the ground line 144 in the second direction (y direction) may be about 3 times the width of the intermediate line 146.

The second contacts 150*a* may connect the gate lines 120*a* to the metal lines 140, e.g., the intermediate lines 146. As shown in FIG. 6B, the second contacts 150*a* may include second contacts 150*a* arranged at the centers of the gate lines 120*a* in the second direction (y direction) and second contacts 150*a* arranged higher in the second direction (y direction).

The vias 160*a* may connect the first contacts 130*a* to the metal lines 140. In detail, the source contacts 132*a* arranged in the first active region ACT1 may be connected to the power line 142 through the vias 160*a*. Also, the source contacts 132*a* arranged in the second active region ACT2 may be connected to the ground line 144 and the intermediate lines 146 through the vias 160*a*. The drain contacts 134*a* arranged in the first active region ACT1 may be connected to the intermediate lines 146 through the vias 160*a*. As described above, the drain contacts 134*a* arranged in the first active region ACT1 may be connected to the source contacts 132*a* arranged in the second active region ACT2 through the vias 160*a* and the intermediate lines 146.

The source isolation structure 170*a* may include a first source isolation structure 170-1 disposed between the second gate line 120*a* and the third gate line 120*a* and a second source isolation structure 170-2 disposed between the sixth gate line 120*a* and the seventh gate line 120*a*. The first source isolation structure 170-1 and the second source isolation structure 170-2 may each be formed to have an SDB structure and extend in the second direction (y direction). The first active region ACT1 and the second active region ACT2 may each be divided into three regions in the first direction (x direction) by the first source isolation structure 170-1 and the second source isolation structure 170-2. Also, based on the source isolation structure 170*a*, individual source regions may be arranged in correspondence to the respective gate lines 120*a*. However, a common source region may be disposed between the fourth gate line 120*a* and the fifth gate line 120*a*.

In the NAND standard cell including the cell 100Na of the present embodiment, the gate lines 120*a*, the first contacts 130*a*, the second contacts 150*a*, and the vias 160*a* may have line-symmetric structures around the first contacts 130*a* arranged in the first active region ACT1 and the second active region ACT2 between the fourth gate line 120*a* and the fifth gate line 120*a*. Also, the cell 100Na of the present embodiment may be separated from cells adjacent in the first direction (x direction) by a cell separation structure 175. The cell separation structure 175 may have an SDB structure. Cells 100Na of the present embodiment may also be arranged in the second direction (y direction). In this case, the power lines 142 and the ground lines 144 may be alternately arranged in the second direction (y direction).

Figure 7A:
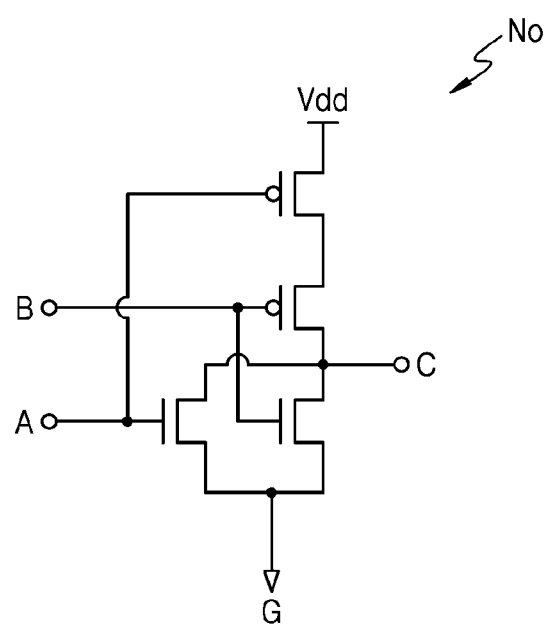
FIG. 7A is a circuit diagram of a cell including individual source regions according to an embodiment.
Figure 7B:
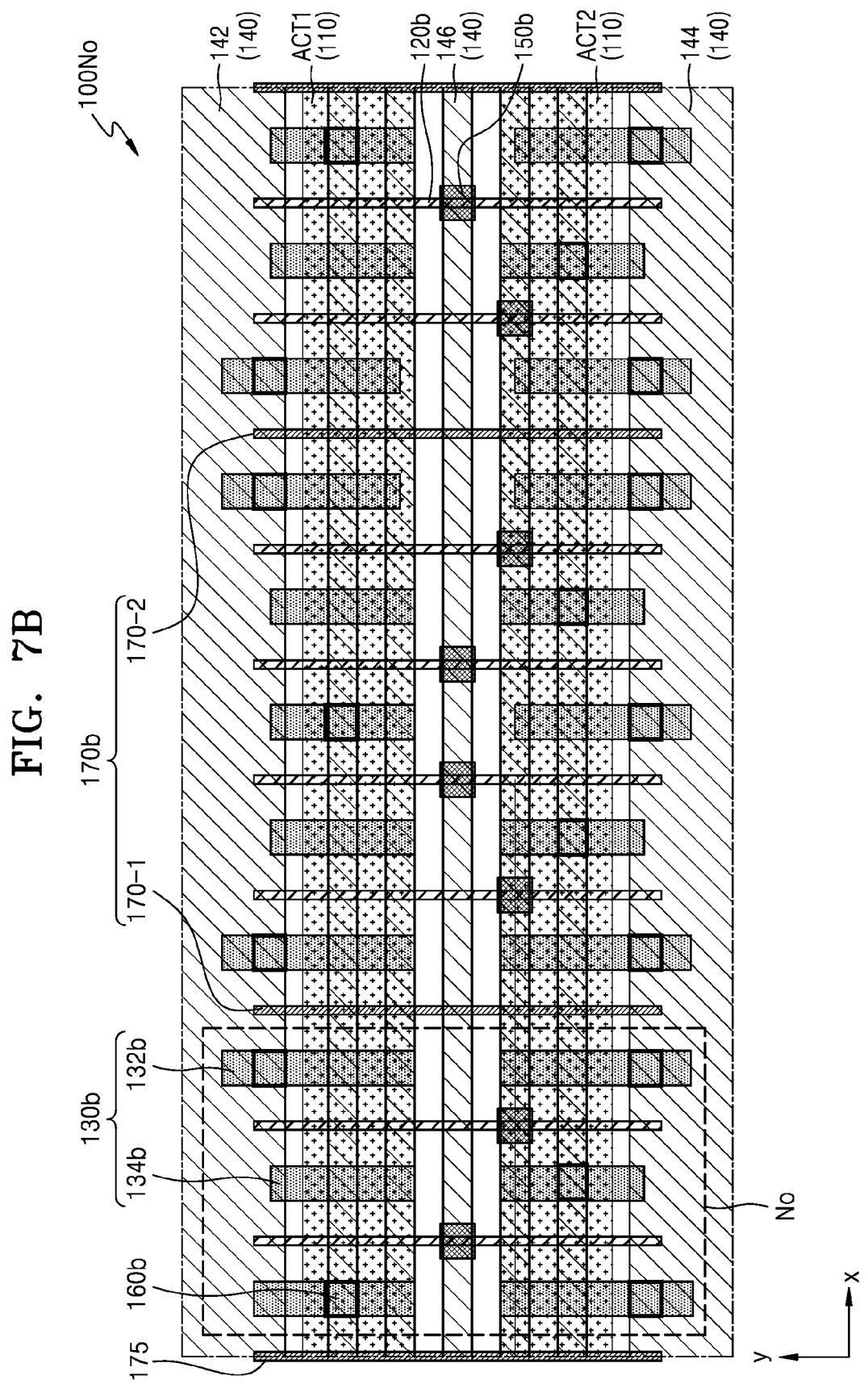
FIG. 7B is a layout diagram of a cell including individual source regions according to an embodiment.

FIG. 7A is a circuit diagram of a cell including individual source regions according to an embodiment. FIG. 7B is a layout diagram of a cell including individual source regions according to an embodiment. FIG. 7A is a circuit diagram for an individual NOR and FIG. 7B is a layout diagram for a NOR standard cell. Descriptions already given above with reference to FIGS. 6A and 6B will be briefly given or omitted.

Referring to FIGS. 7A and 7B, a cell 100No of the present embodiment is a NOR standard cell including individual source regions and may have a structure in which four NORs are connected in parallel. As shown in FIG. 7A, each NOR No may include two PMOSs connected in series with each other and two NMOSs connected in parallel with each other, and the NMOSs may be connected to the PMOSs in series. Also, common gates of two PMOS and an NMOS may become inputs A and B, and a common drain region between a PMOS and an NMOS may become an output C. A power voltage may be applied to source regions of an upper PMOS, and a ground voltage may be applied to source regions of two NMOSs.

As shown in the circuit diagram, NANDs and NORs may have an opposite relationships between connections between two PMOSs and connections between two NMOSs. In other words, in a NAND, two PMOSs are connected in parallel and two NMOSs are connected in series. However, in an NOR, two PMOSs are connected in series and two NMOSs are connected in parallel. Based on the opposite relationship of circuit connections of a NAND and a NOR, the structure of a NOR standard cell including the cell 100No of the present embodiment may have a mirror-symmetrical structure in the second direction (y direction) with respect to the structure of the NAND standard cell of FIG. 6B. In other words, between the NAND standard cell of FIG. 6B and the NOR standard cell of 7B, the NOR standard cell including the cell 100No of the present embodiment and the standard NAND cell of FIG. 6B may have line-symmetric structures around a line extending in the first direction (x direction).

However, the mirror-symmetric structure or the line-symmetric structure may only be established with respect to gate lines 120a and 120b, first contacts 130a and 130b, second contacts 150a and 150b, and vias 160a and 160b and may not be established with respect to the active regions 110 and the metal lines 140. In other words, in the case of the active regions 110, in each of the NAND standard cell of FIG. 6B and the NOR standard cell including the cell 100No of the present embodiment, the first active region ACT1 constituting a PMOS may be disposed at an upper position in the second direction (y direction) and the second active region ACT2 constituting an NMOS may be disposed at a lower position in the second direction (y direction). Also, in the case of the metal lines 140, in each of the NAND standard cell of FIG. 6B and the NOR standard cell including the cell 100No of the present embodiment, the power line 142 may be disposed at the top in the second direction (y direction) and the ground line 144 may be disposed at the bottom in the second direction (y direction).

As the NOR standard cell including the cell 100No of the present embodiment has a mirror-symmetric structure or a line-symmetric structure with respect to the NAND standard cell of FIG. 6B, detailed descriptions of the structure of the NOR standard cell will be omitted.

Referring to FIGS. 5A to 7B, an inverter standard cell, a NAND standard cell, and a NOR standard cell including individual source regions have been described. However, a cell including individual source regions of the present embodiment is not limited to the above-described standard cells. For example, a cell including individual source regions according to the present embodiment may be applied to standard cells of various types described above.

In a cell including individual source regions, since a source isolation structure is disposed as a structure to separate two source regions, an individual source region corresponding to each gate line may be disposed. As such, by disposing individual source regions respectively corresponding to gate lines, cell performance may be significantly improved and, as a source isolation structure is formed to have an SDB structure, the generation of parasitic capacitors may be minimized. Furthermore, performance may be improved through a simple layout change without additional process changes, and thus there is no need for additional cost of time for process changes or improvement.

While the disclosed embodiments has been particularly shown and described with reference to examples thereof, it will be understood that various changes in form and details may be made therein without departing from the spirit and scope of the following claims.

What is claimed is:

1. A cell comprising individual source regions, the cell comprising:
   active regions extending in a first direction and being spaced apart from each other in a second direction different from the first direction;
   gate lines extending across the active regions in the second direction and being spaced apart from each other in the first direction;
   first contacts arranged on both sides of each of the gate lines in the first direction and connected to the active regions;
   metal lines arranged over the gate lines and the first contacts, the metal lines extending in the first direction and being spaced apart from each other in the second direction;
   second contacts connecting the gate lines to the metal lines; and
   vias connecting the first contacts to the metal lines,
   wherein two gate lines of the gate lines adjacent to each other in the first direction comprise a first interval or a second interval greater than the first interval therebetween, and
   wherein a source isolation structure extending in the second direction is provided between the two gate lines adjacent to each other at the second interval, and an individual source region respectively corresponding to the two gate lines through the source isolation structure is provided in the active regions.

2. The cell of claim 1,
   wherein the cell comprises a first outer portion and a second outer portion;
   wherein the cell is separated from other adjacent cells through a single diffusion break (SDB) structure provided on both the first outer portion and the second outer portion of the cell in the first direction,
   wherein the source isolation structure is spaced a distance apart from each of the two gate lines, the distance being substantially identical to the first interval, and
   wherein the source isolation structure comprises the SDB structure.

3. The cell of claim 1, wherein the individual source region is connected to a power line or a ground line from among the metal lines through a corresponding first contact and a corresponding via.

4. The cell of claim 1, wherein the cell is a standard cell in which any of four inverters, four NANDs, or four NORs are connected to one another in a parallel structure.

5. The cell of claim 4,
   wherein the active regions comprise a first active region, which is provided at a high position in the second direction, and a second active region, which is provided at a low position in the second direction,
   wherein the metal lines comprise a power line, which is provided at a top position in the second direction, a ground line, which is provided at a bottom position in the second direction, and intermediate lines between the power line and the ground line,
   wherein the first active region comprises a p-type metal-oxide semiconductor (PMOS) transistor and is connected to the power line and the intermediate lines through the first contacts and the vias, and
   wherein the second active region comprises an n-type metal-oxide semiconductor (NMOS) transistor and is connected to the ground line and the intermediate lines through the first contacts and the vias.

6. The cell of claim 1,
   wherein the cell is a standard cell comprising inverters,
   wherein the active regions comprise a first active region, which is provided at a high position in the second direction, and a second active region, which is provided at a low position in the second direction,
   wherein each of four gate lines extends across the first active region and the second active region,
   wherein the source isolation structure is provided between a second gate line and a third gate line from the left in the first direction and separates each of the first active region and the second active region into two regions, wherein the cell comprises a line-symmetric structure around the source isolation structure, wherein the first contacts are respectively arranged in the first active region and the second active region on the left side of a first gate line from the left in the first direction, and between the second gate line and the source isolation structure, and wherein the first contacts are arranged in the first active region and the second active region between the first gate line and the second gate line from the left in the first direction.

7. The cell of claim 6,
wherein the metal lines comprise:
a power line, which is provided at a top position in the second direction,
a ground line, which is provided at a bottom position in the second direction, and
intermediate lines provided between the power line and the ground line,
wherein contacts of the first contacts arranged only in the first active region are connected to the power line through the vias,
wherein contacts of the first contacts arranged only in the second active region are connected to the ground line through the via,
wherein contacts of the first contacts arranged in the first active region and the second active region are connected to the intermediate lines through the vias, and
wherein the first active region comprises a p-type metal-oxide semiconductor (PMOS) transistor and the second active region comprises an n-type metal-oxide semiconductor (NMOS) transistor.

8. The cell of claim 1,
wherein the cell is a standard cell comprising NANDs,
wherein the active regions comprise a first active region, which is provided at a high position in the second direction, and a second active region, which is provided at a low position in the second direction,
wherein each of eight gate lines extends across the first active region and the second active region,
wherein the source isolation structure is provided between a second gate line and a third gate line and between a sixth gate line and a seventh gate line from the left in the first direction, the source isolation structure separating each of the first active region and the second active region into three regions,
wherein the cell comprises a line-symmetric structure around contacts of the first contacts arranged in the first active region and the second active region between a fourth gate line and a fifth gate line from the left in the first direction,
wherein the first contacts are respectively arranged in the first active region and the second active region on the left side of a first gate line, between the first gate line and the second gate line, and between the second gate line and the source isolation structure, from the left in the first direction,
wherein a contact provided in the second active region on the left side of the first gate line from the left in the first direction is connected to a contact provided in the first active region on the right side through the vias and the metal lines, and
wherein a contact provided in the first active region on the left side of the fourth gate line from the left in the first direction is connected to a contact provided in the second active region on the right side through the vias and the metal lines.

9. The cell of claim 8,
wherein the metal lines comprise:
a power line, which is provided at a top position in the second direction,
a ground line, which is provided at a bottom position in the second direction, and
intermediate lines provided between the power line and the ground line,
wherein the first contacts arranged in the first active region on the left side of the first gate line from the left in the first direction and both sides of the source isolation structure are connected to the power line through the vias,
wherein the first contacts arranged in the second active region on both sides of the source isolation structure from the left in the first direction are connected to the ground line through the vias, and
wherein the first active region comprises a p-type metal-oxide semiconductor (PMOS) transistor and the second active region comprises an n-type metal-oxide semiconductor (NMOS) transistor.

10. The cell of claim 1,
wherein the cell is a standard cell comprising NORs,
wherein the metal lines comprise:
a power line, which is provided at a top position in the second direction,
a ground line, which is provided at a bottom position in the second direction, and
intermediate lines provided between the power line and the ground line, and
wherein the active regions, the gate lines, the first contacts, the second contacts, and the vias of the cell comprise mirror-symmetric structures with respect to the active regions, gate lines, first contacts, second contacts, and vias of a NAND cell in the second direction.

11. The cell of claim 1, wherein the active regions comprise any one of a planar field effect transistor (FET), a fin-FET, and a multi-bridge channel (MBC) FET.

12. An integrated circuit, comprising:
cells arranged in a first direction and a second direction different from the first direction,
wherein each of the cells comprises:
active regions extending in the first direction and being spaced apart from each other in the second direction;
gate lines extending across the active regions in the second direction and being spaced apart from each other in the first direction;
first contacts arranged on both sides of each of the gate lines in the first direction and connected to the active regions;
metal lines arranged over the gate lines and the first contacts, the metal lines extending in the first direction and being spaced apart from each other in the second direction;
second contacts connecting the gate lines to the metal lines; and
vias connecting the first contacts to the metal lines,
wherein two gate lines of the gate lines adjacent to each other in the first direction comprise a first interval or a second interval greater than the first interval therebetween, and
wherein a source isolation structure extending in the second direction is provided between the two gate lines adjacent to each other at the second interval, and an individual source region respectively corresponding to the two gate lines through the source isolation structure is provided in the active regions.

13. The integrated circuit of claim 12,
wherein each cell of the cells comprise a first outer portion and a second outer portion;
wherein each cell of the cells is separated from other adjacent cells through a single diffusion break (SDB) structure provided on both the first outer portion and the second outer portion in the first direction,
wherein the source isolation structure is spaced a distance apart from each of the two gate lines, the distance being substantially identical to the first interval, and
wherein the source isolation structure comprises the SDB structure.

14. The integrated circuit of claim 12, wherein the individual source region is connected to a power line or a ground line from among the metal lines through a corresponding first contact and a corresponding via.

15. The integrated circuit of claim 12, wherein each cell is a standard cell in which any of four inverters, four NANDs, or four NORs are connected to one another in a parallel structure.

16. The integrated circuit of claim 15,
wherein the active regions comprise a first active region, which is provided at a high position in the second direction, and a second active region, which is provided at a low position in the second direction,
wherein the metal lines comprise a power line, which is provided at a top position in the second direction, a ground line, which is provided at a bottom position in the second direction, and intermediate lines provided between the power line and the ground line,
wherein the first active region comprises a p-type metal-oxide semiconductor (PMOS) transistor and is connected to the power line and the intermediate lines through the first contacts and the vias, and
wherein the second active region comprises an n-type metal-oxide semiconductor (NMOS) transistor and is connected to the ground line and the intermediate lines through the first contacts and the vias.

17. An integrated circuit comprising
cells arranged in a first direction and a second direction different from the first direction, wherein the cells are separated from each other in the first direction by a single diffusion break (SDB) structure,
wherein each of the cells comprises:
a first active region and a second active region extending in the first direction and being spaced apart from each other in the second direction;
gate lines extending across the first active region and the second active region in the second direction and being spaced apart from each other in the first direction; and
metal lines arranged over the gate lines, extending in the first direction, and being spaced apart from each other in the second direction,
wherein two gate lines of the gate lines adjacent to each other in the first direction comprise a first interval or a second interval twice the first interval therebetween, and
wherein a source isolation structure extending in the second direction is provided between the two gate lines adjacent to each other at the second interval, and an individual source region respectively corresponding to the two gate lines through the source isolation structure is formed in the first active region and the second active region.

18. The integrated circuit of claim 17,
wherein the source isolation structure is spaced a distance apart from each of the two gate lines, the distance being substantially identical to the first interval, and
wherein the source isolation structure comprising the SDB structure.

19. The integrated circuit of claim 17,
wherein the individual source region comprises a first individual source region provided in the first active region and a second individual source region provided in the second active region,
wherein the first individual source region is connected to a power line from among the metal lines through first contacts and vias, and
wherein the second individual source region is connected to a ground line from among the metal lines through the first contacts and the vias.

20. The integrated circuit of claim 17,
wherein the first active region and the second active region comprise any one of a planar field effect transistor (FET), a fin FET, and a multi-bridge channel (MBC) FET, and
wherein each cell of the cells is a standard cell in which any of four inverters, four NANDs, or four NORs are connected to one another in a parallel structure.

* * * * *